United States Patent Office 3,516,471
Patented June 23, 1970

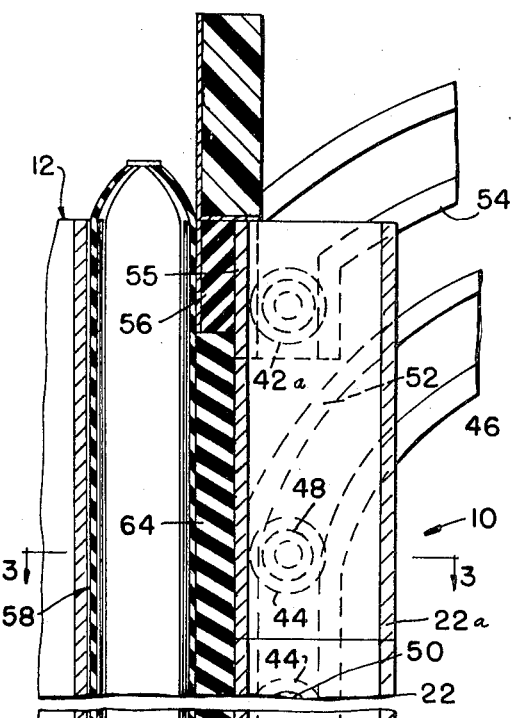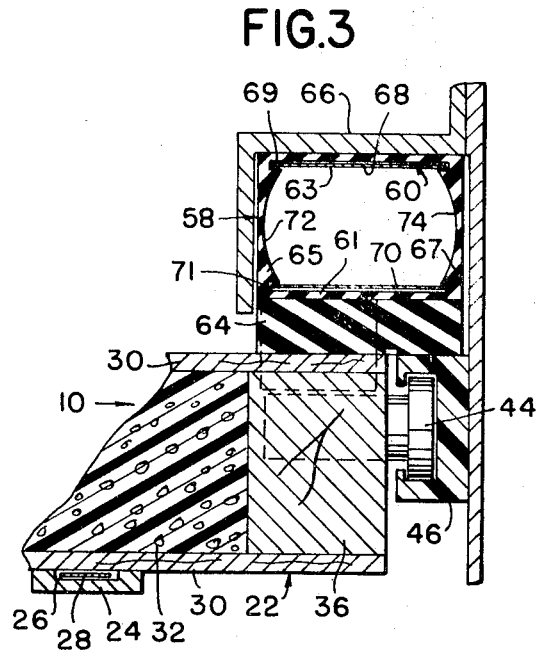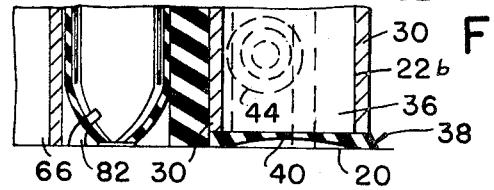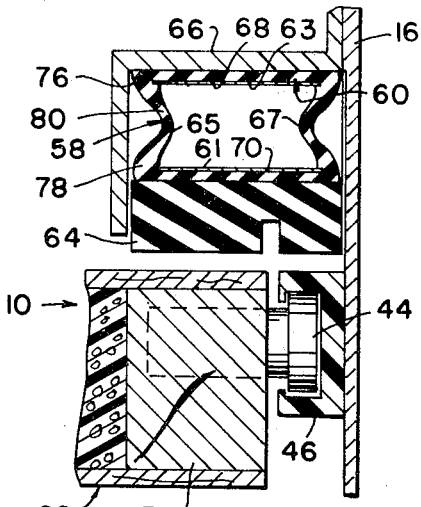
INVENTORS
ALLEN A. HARKINS
RICHARD G. STONER
BRUCE D. CAULKINS

3,516,471
SEAL STRUCTURE
Allen A. Harkins, Grosse Ile, Mich., Richard G. Stoner, 806 Washington Road, Grosse Pointe, Mich. 48236, and Bruce D. Caulkins, 806 Shoreclub Drive, St. Clair Shores, Mich. 48080; said Harkins assignor to said Stoner and said Caulkins
Filed Mar. 25, 1968, Ser. No. 715,845
Int. Cl. E06b 7/18
U.S. Cl. 160—40                     5 Claims

ABSTRACT OF THE DISCLOSURE

A seal structure is provided for sealing the space between a fixed structure defining an opening and a movable closure member slidably associated therewith. The movable closure structure is preferably a sliding overhead type door having articulated horizontal sections mounted on the loading opening of truck trailer bodies, shipping containers, and some home garages where temperature control is desired. One of the seal structures is provided on the fixed structure on each side of the opening. The seal structures each comprises a hollow sealing actuator carried by the fixed structure. Each sealing actuator has flexible, resilient wall portions which define a closed chamber. A sealing element is provided on each sealing actuator between the sealing actuator and the door. The wall portions of the sealing actuator normally expand because of their resiliency and maintain the sealing element in sealing contact with the door. A vacuum pump is provided. The pump is connected to the hollow chamber of the sealing actuator to collapse the chamber when it is desired to open the door and relieve the sealing element of sealing contact with the door to thereby permit the door to be raised and lowered without contact of the door with the sealing structure.

BACKGROUND OF THE INVENTION

Overhead type sliding sectionalized doors are commonly used in connection with transportation units such as trucks, trailers, and railroad cars. Such doors are desirable because they are easy to operate and do not require door-opening room at a loading dock. The use of such doors in refrigerated units has not been widespread because of the difficulty in providing a seal for the door. As will be appreciated, a seal which contacts a sliding door will result in a frictional drag when the door is moved to the open or closed position.

In the past, inflatable seals have been used. Such seals have been inflated to seal the door and deflated when it is desired to open or close the door. However, inflatable seals have the objection that in the event a leak is developed, the seal fails resulting in opening a space between the seal and the door. This may result in damage to a refrigerated cargo.

Solid seals which are mechanically moved into and out of sealing engagement with sliding doors have also been used. However, the mechanism necessary to move such solid seals into and out of engagement with a door have been complicated and expensive. Additionally, the maintenance of such mechanically operated seals has been difficult.

The present invention provides a hollow resilient seal for such sliding doors which normally expands into sealing engagement as a consequence of the resilient material from which the seal is fabricated. The seal has a hollow chamber which is subjected to vacuum to cause collapse of the seal when it is desired to raise or lower the sliding door. As will be appreciated, if a break does develop in the seal, the seal will not fail because the sealing action does not depend upon air pressure. Therefore, no damage can occur to a refrigerated cargo. Further, a leak in the seal will not normally prevent opening and closing of the door because air may usually be evacuated faster than it will leak into the seal to permit collapse of the seal for the period necessary to open or close the door.

In co-pending application Ser. No. 590,844, filed Oct. 31, 1966, now Pat. No. 3,424,222, there is disclosed a seal structure of the general nature of that presently envisaged. However, the present invention provides several desired modifications of the seal structure described in said application.

SUMMARY OF THE INVENTION

A seal structure for sealing a space between a fixed member defining an opening and a movable closure member slidably associated therewith. A seal structure comprising a hollow sealing actuator is carried by one of said members. The sealing actuator has flexible, resilient wall portions which define a closed chamber. A sealing element is provided between the sealing actuator and the other of said members. The wall portions of the sealing actuator normally maintain the sealing element in sealing contact. Vacuum means are connected to the chamber to collapse the chamber and relieve the sealing element of sealing contact to thereby allow substantially unrestricted movement between the closure member and the fixed member.

The seal structure is adapted for application to a closure member including a plurality of horizontally articulated sections guided for movement between both open and closed positions in tracks carried by the fixed member. At least one flexible strap extends between and is secured to the endmost of the articulated sections. The strap passes through guide means provided on each of the intermediate articulated sections to maintain these sections in relative position with respect to each other. The tracks may include a first track fixedly secured adjacent the side portions of the fixed member to rotatably receive rollers provided on the sections. A second track is positioned above the first track. The second track receives a roller on the uppermost section while the first track receives all of the remaining rollers to the end that the uppermost portion of the upper section will be pressed against the fixed frame member in sealing engagement therewith upon closure thereof.

In the drawing:

FIG. 1 is an interior vertical sectional view of a truck or trailer body illustrating the inside of a door and seal in the closed position forming one embodiment of the present invention;

FIG. 2 is a vertical section of the door and seal structure taken substantially along the line 2—2 of FIG. 1 looking in the direction of the arrows;

FIG. 3 is a horizontal section of one end of the door and seal taken substantially along the line 3—3 of FIG. 2 looking in the direction of the arrows and illustrating the door seal in the sealing position;

FIG. 4 is a sectional view similar to FIG. 3 illustrating the door seal in the non-sealing position.

Referring to FIG. 1, it will be noted that the present invention is adapted for use in connection with a segmented overhead sliding door 10 which may be mounted on a truck or trailer body 12 to close the rear end opening thereof. The body 12 has the usual elongated boxlike configuration comprising side walls 14, 16, top wall 18, and bottom wall or floor 20.

The door 10 includes a plurality of horizontally extending, articulated segments or sections 22 guided for movement between both open and closed positions in tracks 46, 54 carried on the side walls 14, 16. The sections 22 are not directly hinged together. Each section 22 between the top section 22a and bottom section 22b has a plurality, shown as four in number, of pairs of brackets 24 which are spaced horizontally across the section 22. The brackets forming a pair are spaced vertically with respect to each other. The upper and lower sections 22a, 22b, have single brackets 24 in alignment with the pairs of brackets on the central sections 22.

As will be seen by reference to FIG. 3, each bracket 24 has a central opening 26 through which extends a flexible strap 28. A strap 28 extends through each column of aligned brackets 24 and is secured at its upper and lower ends to the sections 22a, 22b as by rivets. The straps 28 may be fabricated of a reinforced plastic material. The sections 22 have casters 42, 44 at each end thereof which ride in the tracks 46, 54 as will be later described. The straps 28 maintain the sections 22 in general alignment without a positive connection between each adjacent section. This results in a "floating" action which permits the sections to move out of alignment with each other without placing undue strain on the straps. In prior art constructions, the sections have been directly hinged one to the other. The hinge has been the weakest point in the construction and has frequently broken because of the strain imposed thereon by movement of the sections. This is particularly a problem where the door is required to pass around a curved section. The use of the straps 28 results in the desired general alignment of the door sections without posing the problem of broken hinges.

Each of the sections 22 has substantially the same construction. The sections include a pair of spaced plates 30 having a heat-insulating material 32 disposed between the respective inner surfaces of the spaced plates. The plates 30 are preferably fabricated of plywood although a metal or plastic plate may be used. The insulating material 32 is preferably a closed cell polyurethane material or any other material having a how thermal conductivity and low density. Sealing members may be provided on the upper and lower edges of the sections to seal adjacent section. Vertically extending rails 34, 36 are provided at each outer edge of the sections 22. The rails 34, 36 may be fabricated of a wood material such as laminated impregnated pine. The rails 34, 36 lend structural rigidity to the sections 22. The sections 22 may be originally fabricated as a large sandwich panel which is sawn into the sections illustrated.

As will be noted in FIGS. 1 and 2, the lower edge of the lower door section 22a is provided with an elongated sealing member 38. The sealing member 38 extends the width of the door 10. In order to effect a good seal between the floor 20 and the door, the lower surface 40 of the seal 38 is concave. When the door is lowered so that the seal 38 engages the floor 20, the concave surface 40 allows the door seal to expand horizontally thereby effecting a good seal between the lower edge of the door and the floor 20.

Each section 22 is provided with a pair of casters 42, 44 at each end thereof. A U-shaped track 46 is provided on each side wall 14, 16 of the body 12. The track 46, which may be characterized as the main track, receives the casters of all of the segments except the caster 42a of the upper section 22a. Each of the casters 42, 44 has an axle 48, 50 which is suitably journaled in an opening in the rails 34, 36 of the sections 22. Both the casters and the tracks are preferably fabricated of a plastic material to insure smooth and quiet operation. The tracks extend from the floor 20 up the side walls 14, 16 and curve at 52 to run horizontally along the upper edge of the side walls 14, 16 a distance sufficient to receive the entire door 10.

As will be noted in FIG. 2, a second track 54 is provided above the track 46. The track 54 receives the upper casters 42a of the upper door section 22a. This offsets the top edge portion 55 of the upper section 22a towards and against a sealing member 56 which extends across the width of the truck body 12. The sealing member 56 may, for example, be fabricated of a closed cell neoprene material. The offsetting of the portion 55 of the segment 22a results in a satisfactory seal at the top of the door when the door is closed.

As will be noted in FIGS. 3 and 4, the door 10 is spaced from the side walls 14, 16 of the body 12 so that the door may be readily moved between the open and closed positions without frictional drag caused by the door being in sliding contact with a portion of the body. In order to attain this freedom of movement of the door with respect to the sides of the body, a vertical space must be provided between the door opening and the door structure. According to the invention, an improved seal structure 58 is employed to seal the vertical side edges of the doors and the frame defining the opening.

One of the seal structures 58 is provided along each side edge of the door, and is received and maintained in a vertically extending channel 66 which is fixedly secured to the side wall. Each seal structure 58 includes a chamber or enclosure 60 formed by airtight solid-skin flexible wall structure comprising front and back walls 61, 63 and side walls 65, 67. The front wall 61 has an impervious sealing element 64 formed of a resilient rubber-like material. The sealing element 64 is adapted to move into and out of engagement with the outer surface of the door 10. The flexible walls 61, 63, 65, 67 forming the chamber 60 have sufficient resiliency to maintain the chamber in expanded position as illustrated in FIG. 3. In this position, the sealing element 64 is forced into sealing engagement with the track 46 and adjacent side edges of the door 10 to fully seal the door when it is in the closed position. It will be appreciated that the sealing element 64 may be formed integrally with the wall 61 or may be carried on the door 10.

A pair of vertically extending metal plates 68, 70 are provided interiorly of the chamber 60 on the interior surfaces of the walls 61, 63. The edges of these plates are received in grooves 69, 71 formed in the interior of the chamber. The grooves 69, 71 extend for a distance into the side walls 65, 67 whereby the edges of the plates 68, 70 form fulcrum points for the even collapse of the side walls. The interior side surfaces 72, 74 of the side walls 65, 67 are concave, resulting in the wall portions 76, 78 at the edges being thicker than the central wall portion 80.

Each chamber 60 is in communication, via a conduit 82, with a vacuum pump (not shown) or other suitable vacuum source carried by the truck body.

In operation, the seal structure is normally in the expanded condition, as shown in FIG. 3, with the sealing element 64 in contacting engagement with the door 10 and track 46 to seal the vertically extending opening between the door and the body 12. When it is desired to raise or lower the door, the vacuum source is actuated to produce a vacuum in the chamber 60 thereby collapsing the chamber, as shown in FIG. 4, to move the sealing element 64 out of engagement with the outer surface of the door. This will allow unrestricted movement of the door with respect to the fixed frame during opening and closing thereof. The vertically extending stiffening members 68, 70 and the concave configuration of the side walls 65, 67 of the chamber 60 cause the side walls to collapse in an accordion-like fashion as shown in FIG. 4 to result in the sealing element 64 being retracted evenly from the door 10 and track 46.

When it is desired to reseal the door 10, it is only necessary to release the vacuum applied to the chamber 60. The chamber then will expand to cause contact of the element 64 with the door 10 and track 46 to again seal the opening.

What we claim as our invention is:
1. A seal structure for sealing an elongated space between a fixed member defining an opening and a movable closure member slidably associated therewith comprising an elongated hollow sealing actuator carried by one of said members, said sealing actuator having flexible, resilient wall portions including oppositely disposed side wall portions and oppositely disposed front and back wall portions, defining a closed chamber, said front wall portion including an elongated sealing element positioned between the sealing actuator and the other of said members and extending for the length of said space, said wall portions of the sealing actuator normally maintaining said sealing element in sealing contact, and vacuum means connected to said chamber to collapse the chamber with the oppositely disposed side wall portions folding in an accordion manner to withdraw said sealing element from contact along its entire length with the other of said members to thereby allow substantially unrestricted movement between the closure member and the fixed member, said oppositely disposed front and back wall portions positioned generally right angularly to the direction of collapse of said oppositely disposed side wall portions, each of said oppositely disposed front and back walls having relatively rigid reinforcing means on the inner portion thereof to prevent collapse of the front and back walls during collapse of said chamber and provide a fulcrum point for the collapse of said oppositely disposed side wall portions to thereby provide even and entire withdrawal of the sealing element from contact with the other of said members.

2. A seal structure as defined in claim 1, and further characterized in that said oppositely disposed side wall portions have internal concave surfaces to aid in the even folding thereof during collapse of the chamber.

3. A seal structure as defined in claim 1, and further characterized in that said reinforcing means comprises a metallic plate provided on the inner surface of each of said oppositely disposed front and back walls.

4. A seal structure as defined in claim 3, and further characterized in that said plates each extend for a distance into said oppositely disposed side walls to form said fulcrum point for the collapse of said pair of oppositely disposed side walls.

5. A seal structure as defined in claim 2, and further characterized in that said reinforcing means comprises a metallic plate provided on the inner surface of each of said oppositely disposed front and back walls.

References Cited

UNITED STATES PATENTS

| 583,375 | 5/1897 | Hood | 49—477 X |
|---|---|---|---|
| 2,015,402 | 9/1935 | Johanson | 160—189 |
| 2,713,899 | 7/1955 | Holloway et al. | 160—199 |
| 2,763,038 | 9/1956 | Hagerty et al. | 49—477 X |
| 2,767,787 | 10/1956 | Miller | 160—209 |
| 3,169,540 | 2/1965 | Moore et al. | 220—46 X |
| 3,359,687 | 12/1967 | Wallace | 49—477 |
| 1,857,756 | 5/1932 | Headley | 160—209 |
| 1,921,305 | 8/1933 | Wiesman | 160—201 |
| 2,003,614 | 6/1935 | Shetzline | 49—477 |
| 3,449,864 | 6/1969 | Prost-Dame et al. | 49—477 |

FOREIGN PATENTS

| 1,146,884 | 5/1957 | France. |
|---|---|---|
| 282,658 | 9/1952 | Switzerland. |

J. KARL BELLL, Primary Examiner

U.S. Cl. X.R.

49—477, 489